SOLID STATE MAGNETRON MODULATOR MISMATCH PROTECTIVE CIRCUIT
Filed Sept. 7, 1966
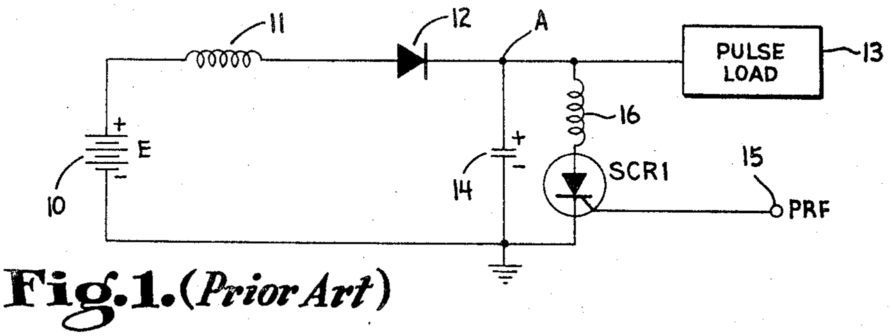
Fig.1. (*Prior Art*)
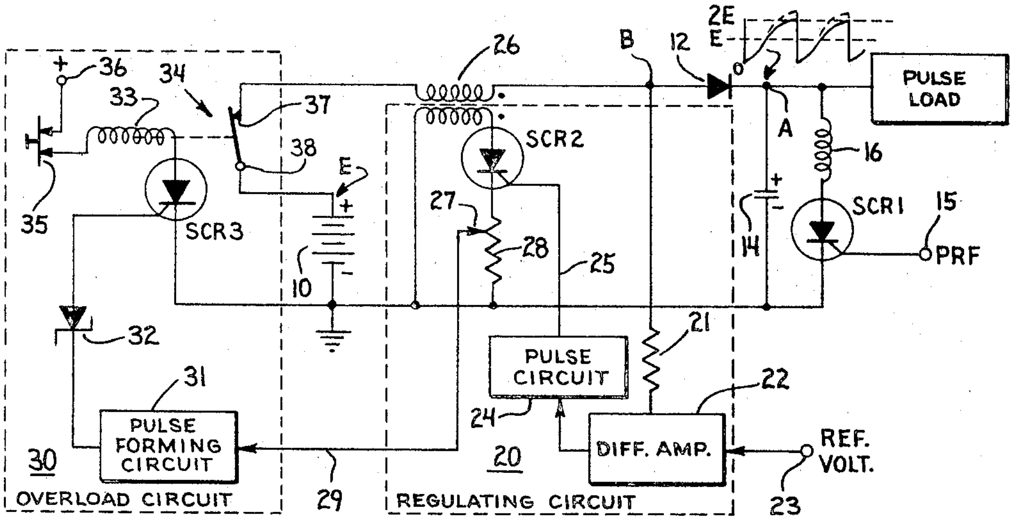
Fig. 2.
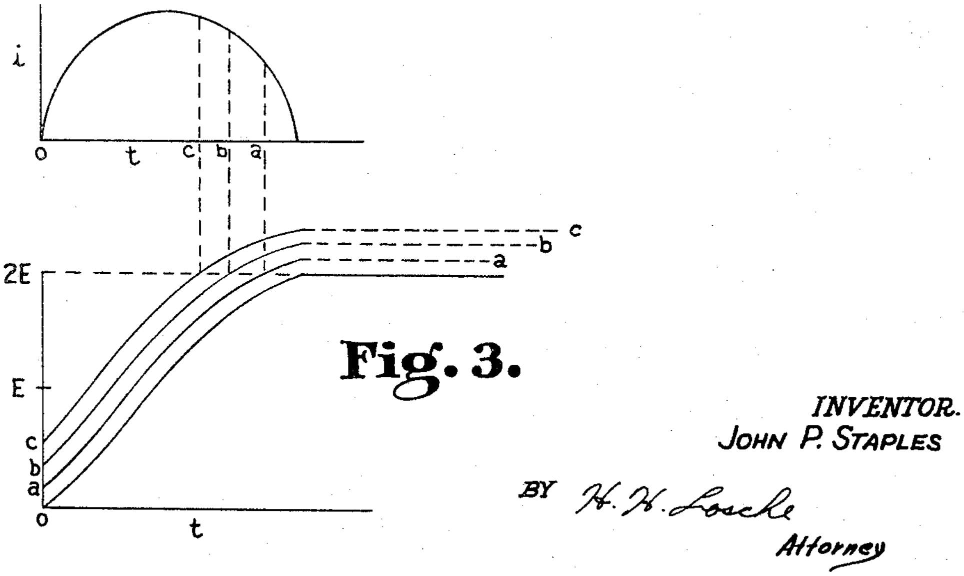
Fig. 3.
INVENTOR.
JOHN P. STAPLES
BY H. W. Losche
Attorney

United States Patent Office 3,405,321

Patented Oct. 8, 1968

3,405,321

SOLID STATE MAGNETRON MODULATOR MISMATCH PROTECTIVE CIRCUIT

John P. Staples, Indianapolis, Ind., assignor to the United States of America as represented by the Secretary of the Navy

Filed Sept. 7, 1966, Ser. No. 577,784

6 Claims. (Cl. 317—33)

The invention described herein may be manufactured and used by or for the Government of the United States of America for governmental purposes without the payment of any royalties thereon or therefor.

This invention relates to protection circuits for modulators that supply pulses to pulse loads, such as to the magnetrons of radar transmitters, and more particularly it relates to regulation and overload circuits to automatically regulate pulse amplitude for impedance mismatch between the modulator and the pulse load and to automatically disconnect the modulator and the pulse load from the voltage supply source when mismatch between the modulator and pulse load reaches a predetermined value.

There are various known protection circuits for modulators including those which sense power supply current overshoot, or missing pulses. These protection circuits disconnect the modulator from the power supply, disconnect the modulator from the load, or disable the modulator. Many times these sensing devices are coupled to a thermal relay which shuts off the circuit after a number of faults have occurred. These sensing devices are often in the pulse load device where the pulses are of high voltage amplitude and difficult to maintain because of the high voltage values. Often, too, separate circuits are required to sense missing pulses, pulse overshoot, and impedance mismatch which become complicated in circuit requirements.

In the present invention rapid, accurate, and reliable operation of a regulation and a protection circuit is provided by the use of solid state elements. The sensing of faults in this invention is at a low voltage point between the modulator voltage source and the modulator charging capacitor applied to a differential amplifier having a reference voltage as the second input. When this reference voltage is exceeded, the differential amplifier will produce an output signal which will activate a pulse circuit to control the conduction of a silicon controlled rectifier (SCR) in circuit with a secondary winding magnetically coupled to the inductance in the LC circuit of the modulator. This controls the amplitude of the charge on the capacitor in the LC circuit. When a predetermined limit of fault is reached through the sensing circuit, this overload is sensed through a crystal rectifier to switch another SCR to energize a normally closed relay switch in the power supply circuit to the modulator. In this manner faults in a pulse load are sensed to control the charging voltage in the modulator and faults of predetermined magnitude automatically cut off the voltage supply. It is a general object, therefore, to provide a modulator protection circuit for a modulator supplying pulses to a pulse load which will automatically control pulse overshoot to a minimum and will cut off the modulator power supply whenever impedance mismatch between the modulator and pulse load causes modulator current flow to exceed a predetermined amount.

These and other objects and the attendant advantages, features, and uses will become more apparent to those skilled in the art as a more detailed description proceeds when considered with the accompanying drawing, in which:

FIGURE 1 illustrates a simplified modulator circuit for providing pulses to a pulse load which substantially represents the prior art;

FIGURE 2 illustrates partially in schematic and partially in block diagram a modification to FIGURE 1 providing a regulating circuit and an overloaded circuit for protection of the modulator and pulse load; and FIGURE 3 represents voltage and current waveforms which take place in the circuit of FIGURE 2.

Referring more particularly to FIGURE 1, the simplified modulator circuit illustrated herein is supplied an initial voltage E from a voltage source identified herein as a battery 10 having the negative terminal grounded and the positive terminal coupled through an inductance 11 and through a diode 12 to a pulse load 13. The voltage E supplied through 11 and 12 charges a storage capacitor 14 which is coupled between terminal point A and ground providing an LC circuit by 11 and 14. The capacitor 14 will charge to the value of 2E by the charging inductor 11 and be locked at this voltage by the diode 12. In parallel with the capacitor 14 is an inductance 16 in series with an SCR1 having a control terminal 15 to which is applied a pulse repetition frequency (PRF) source to establish the voltage pulses to the pulse load 13. As is recognized by those skilled in the art, the PRF applied to terminal 15 will produce a discharge of capacitor 14 at the PRF rate which discharge will cut off SCR1 each cycle and allow the capacitor 14 to charge to the value 2E between PRF pulses. These pulses being established at terminal A are applied to the pulse load 13 which may be a magnetron or other device requiring pulses for the operation of a system, such as a radar transmitter.

Referring more particularly to FIGURE 2 wherein like reference characters are applied to like parts as found in FIGURE 1, the circuit of FIGURE 1 is modified to incorporate a regulating circuit 20 and an overload circuit 30. The regulating circuit 20 senses the charging voltage at a low voltage point B preceding the diode 12 which voltage is applied through a current limiting resistor 21 to a differential amplifier 22. A reference voltage is applied to a terminal 23 of the differential amplifier as a second input thereto which reference voltage is of an amplitude equal to voltage 2E so that the differential amplifier will produce a signal on its output whenever the voltage from terminal B exceeds the reference voltage on terminal 23. The output of differential amplifier 22 is applied to a pulse circuit 24, the output pulses of which are applied over a conductor 25 to the control terminal of an SCR2. The inductance 11 of FIGURE 1 is replaced in FIGURE 2 by a transformer 26 in which the primary provides the charging inductance in the modulator circuit from the voltage source 10 to the pulse load and the secondary of which has one terminal coupled directly to ground and the opposite terminal coupled to the anode of the SCR2. The polarity of the transformer 26 is as shown by dots in FIGURE 2 and may be of a 1:1 turn ratio for the purpose more fully hereinafter described. The cathode of the SCR2 is coupled through a potentiometer resistance 28 to the fixed zero or ground potential. Potentiometer 28 has an adjustable tap 27. Whenever the voltage at terminal B exceeds the reference voltage at 23 to produce an output from the differential amplifier 22, the pulse circuit 24 will become operative to control the SCR2 into operation to substantially short out the secondary of transformer 26 which will, in effect, short the primary of transformer 26 for any currents operative to produce voltages above the voltage 2E. In the absence of any impedance mismatch between the pulse load 13 and the modulator circuit, the voltage at terminal A, or the positive plate of the storage capacitor 14, will appear as the waveform shown above terminal A in solid lines. Any impedance mismatch between the pulse load and the modulator, as by the magnetron or other pulse load either shorting out or having an open circuit causing a change in impedance, will prevent capacitor 14 from completely discharging thereby leaving a residual voltage on the positive plate appearing at terminal A. Successive charges of capacitor 14 will attempt to drive this charge to 2E plus this residual voltage, as shown in dotted lines above the waveform of terminal A. It is this additional charging voltage which is sensed at terminal B through the regulating circuit to actuate the SCR2 to effectively short out the current of the primary of transformer 26 so that the capacitor 14 will only charge to the 2E voltage.

Whenever a residual voltage is stored in capacitor 14 causing the modulator to attempt to charge 14 to 2E producing a high current through the secondary of transformer 26, the SCR2, and the resistance element of potentiometer 28, the voltage drop across the resistance of 28 will be sufficient to produce a voltage at the adjustable tap 27 operative over the conductor means 29 to actuate the overload circuit 30. The conductor 29 is coupled through a pulse forming circuit 31 and a Zener diode 32 to the control electrode of an SCR3 in the overload circuit 30 which circuit 31 will produce an output pulse for every pulse produced through the SCR2 and across the resistor of 28. When the voltage at the adjustable tap 27 reaches the Zener voltage of Zener diode 32 in the output pulse forming circuit 31 to the control electrode of SCR3, SCR3 will be switched into conduction. The tap 27 of the potentiometer 28 may be adjusted for the desired operation point of the overload circuit 30. The anode of SCR3 is coupled through the electromagnetic coil 33 of a relay switch 34 to one contact of a manual switch 35, the other switch terminal of which is coupled to a positive voltage source at 36, which could be taken from the positive terminal of the voltage source 10. The relay switch 34 has its switch blade terminals 37 and 38 coupled in the conductor 39 leading from the voltage source 10 to the primary winding of transformer 26. Accordingly, whenever SCR3 is placed in conduction, the normally closed relay 34 will open the switch contacts 37 and 38 breaking the circuit to the modulator and thus to the pulse load 13.

Referring more particularly to FIGURE 3, the waveforms of the charging current $i$ and the capacitor 14 voltage $V_c$ are shown in which the curve extending from zero $V_c$ proceeds upwardly precisely to the voltage 2E, which is representative of proper impedance match between the pulse load and the modulator. The voltage curve marked $a$ corresponds to a slight impedance mismatch where the capacitor 14 has a residual voltage when it starts to charge in a new cycle. Point $a$ on the current curve $i$ shows how much of the charge current is shunted through SCR2 and the resistor of potentiometer 28 away from the capacitor 14. The curve marked $b$ is similar to curve $a$ but with a slightly greater impedance mismatch between the pulse load and the modulator. The curve marked $c$ illustrates a large mismatch where the current through the resistor of potentiometer 28 would develop a voltage drop at tap 27 and over the conductor 29 producing a voltage pulse out of 31 exceeding the Zener voltage of the Zener diode 32 to place SCR3 into conduction thereby tripping the relay 34 to open the circuit of the voltage source 10 to the modulator.

OPERATION

While the operation is believed to be understood from the detailed description hereinabove, let it be assumed that pulse load 13 is providing no mismatch in impedance from that of the modulator providing proper operation for the system of pulsing a magnetron, or the like. The voltage waveform appearing at terminal A will be as shown in solid lines to produce pulses occurring in coincidence with the PRF applied at terminal 15 to SCR1. The voltage sensed at terminal B will not be sufficient to produce any output from the differential amplifier 22 and, accordingly, the regulating circuit 20 and the overload circuit 30 will be in quiescent states.

Now let it be assumed that some fault occurs in the pulse load circuit 13 which would produce some impedance mismatch with the modulator to attempt to produce a residual voltage on the positive plate of the capacitor 14, as shown in dotted lines above the solid line waveform above terminal A, or as represented by the curves $a$ and $b$ in FIGURE 3. The voltage 2E plus the residual voltage attempted to be built up on the positive plate of capacitor 14 will be sensed at terminal B which will exceed the reference voltage applied at terminal 23 and will produce a differential amplifier output to the pulse circuit 24 for each PRF pulse produced. The first of these pulses will be applied by way of conductor 25 to SCR2 placing this SCR2 into conduction for each pulse. Since SCR2 shorts out the secondary of transformer 26 for each pulse it will be cut off at the termination of each pulse since the cathode and anode would be brought to substantially the same voltage. Shorting of the secondary of transformer 26 also, in effect, shorts the primary of transformer 26 so that the current in this primary is only operative for a period of time to charge the capacitor 14 to the value 2E. If this voltage value attempts to proceed above the voltage 2E, the current in the primary of transformer 26 will be effectively shorted out. This regulates the current through the primary of transformer 26 to maintain the charging voltage plus any residual voltage in capacitor 14 to rise to the amplitude of 2E and no more. Accordingly, as the impedance mismatch becomes greater, the voltage pulses at terminal A applied to pulse load 13 will remain as shown in the solid line. However, if the impedance mismatch becomes so great that the secondary of transformer 26 produces a high current for every pulse that SCR2 is turned "on" sufficient to produce a voltage drop across the resistance element of potentiometer 28 to produce a proportionate voltage at tap 27 which will exceed the Zener voltage of the Zener diode 32, the overload circuit 30 will become operative by switching SCR3 into conduction to open the relay circuit 34 and this relay will remain energized. To reset the overload circuit, switch 35 will have to be momentarily opened which will bring the anode-cathode of the SCR3 to equal voltage and a new pulse from 31 through the Zener diode 32 would have to be present to place SCR3 into conduction again. Accordingly, the circuit elements of the pulse load 13 and of the modulator will be protected from any over voltages occurring since the regulating circuit 20 will maintain the charge on capacitor 14 at a maximum limit. Also, the impedance mismatch between the pulse load and modulator may increase. If the impedance mismatch becomes too great, the overload circuit will become operative to shut down the system by virtue of interrupting the circuit from the voltage source 10 to the modulator.

While many modifications and changes may be made in the constructional details and features of this invention to provide same or similar results within the spirit and conception of the invention, I desire to be limited in my invention only by the scope of the appended claims.

I claim:

1. A regulation and protection circuit for a modulator having an inductance-capacitance network with a diode therebetween and a silicon controlled rectifier for discharging said capacitance to supply voltage pulses to a pulse load comprising:

an inductive means in magnetic coupling with the inductance of said network, said inductance being in a circuit loop;

a first switching means in said circuit loop, said switching means having a control electrode;

fault sensing means coupled to said modulator between said inductance and diode with an output coupled to said control electrode of said first switching means to control said first switching means to limit the current flow in said circuit loop and through said inductance in said network to limit the charging voltage on said capacitance; and an overload circuit having a second switching means in the voltage supply to said modulator with a switch control electrode therefor coupled through a voltage limiting means to said first switching means loop to open said second switching means whenever the voltage in said loop exceeds the voltage of said limiting means.

2. A regulation and protection circuit as set forth in claim 1 wherein said inductive means is a transformer secondary winding; and said first switching means in said loop is a first silicon controlled rectifier having its anode coupled to one lead of said transformer secondary and its cathode coupled through a resistive element to the other lead of said transformer secondary, said other lead being coupled to zero potential.

3. A regulation and protection circuit as set forth in claim 2 wherein said fault sensing means is a differential amplifier having a reference voltage as one input thereto and said coupling to said modulator being the other input thereto, said reference voltage being of an amplitude equal to the maximum pulse amplitude of said modulator voltage pulses for charging said capacitance.

4. A regulation and protection circuit for a modulator as set forth in claim 3 wherein said voltage limiting means in said overload circuit is a Zener diode in series in said coupling to said first switching means loop with a pulse forming circuit, and said second switching means is a second silicon controlled rectifier with the anode thereof coupled through the relay coil of a relay switch having switch contacts in said modulator supply voltage circuit and the cathode thereof coupled to zero potential to open the supply voltage circuit whenever voltage in said first switching means loop exceeds the Zener voltage of said Zener diode.

5. A regulation and protection circuit for a modulator as set forth in claim 4 wherein said output of said differential amplifier is through a pulse circuit to produce a pulse voltage on the control electrode of said first silicon controlled rectifier for each differential amplifier output voltage signal.

6. A regulation and protection circuit for a modulator as set forth in claim 5 wherein said Zener diode in series with a pulse forming circuit to said first switching means loop is to a tapped point of said resistive element which tapped point is adjustable.

References Cited

UNITED STATES PATENTS

| | | | |
|---|---|---|---|
| 2,438,962 | 4/1948 | Burlingame et al. | 328—9 |
| 2,733,338 | 1/1956 | Alsmeyer | 328—9 |
| 2,750,506 | 6/1956 | Haagensen | 332—5 X |
| 2,815,445 | 12/1957 | Young et al. | 331—62 X |
| 2,820,900 | 1/1958 | Scal | 331—62 |
| 2,864,058 | 12/1958 | Fredrick | 328—9 |
| 3,277,342 | 10/1966 | Ross | 331—62 X |

LEE T. HIX, *Primary Examiner.*

J. D. TRAMMELL, *Assistant Examiner.*